April 3, 1928.
C. C. HANCH
1,664,507
LUBRICATING PISTON
Filed Feb. 9, 1922
2 Sheets-Sheet 1
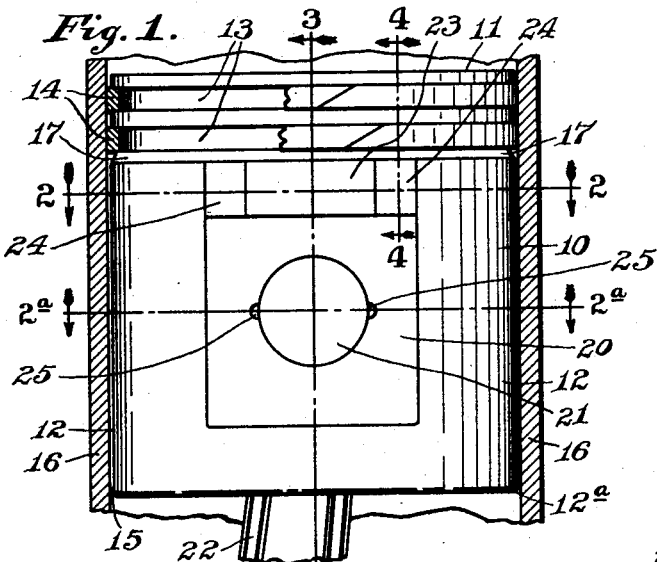
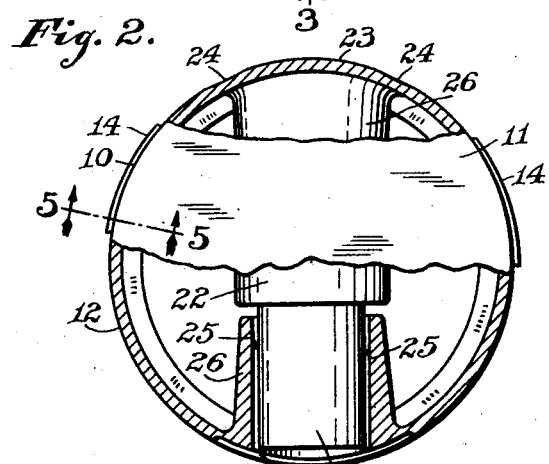
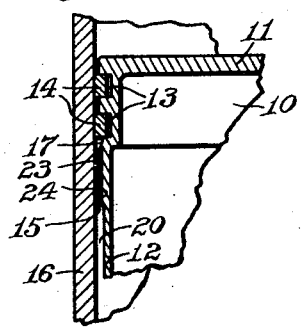
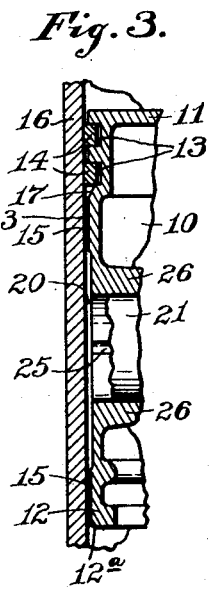
INVENTOR
Charles C. Hanch,
BY
G. ? Schley.
ATTORNEY April 3, 1928.
C. C. HANCH
LUBRICATING PISTON
Filed Feb. 9, 1922
1,664,507
2 Sheets-Sheet 2
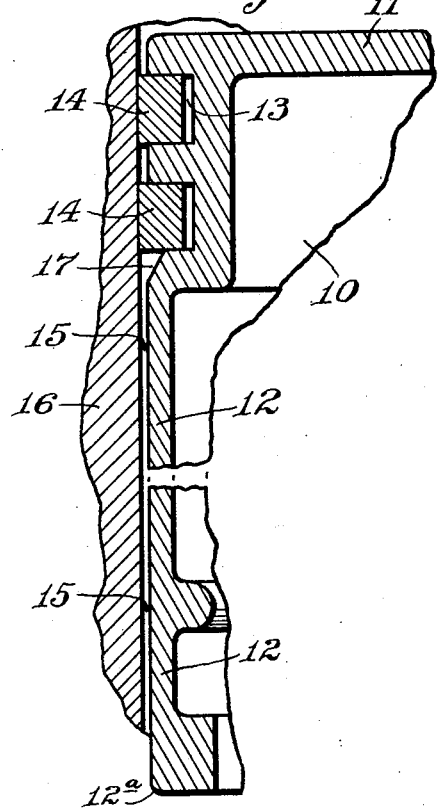
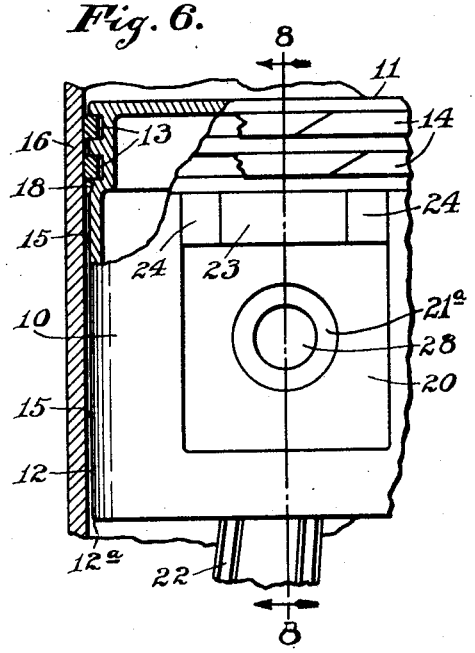
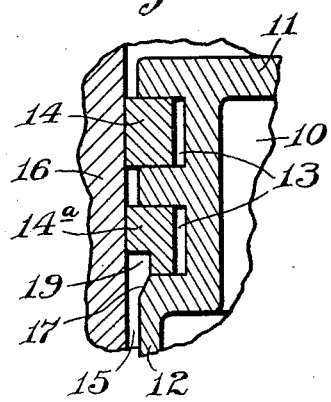
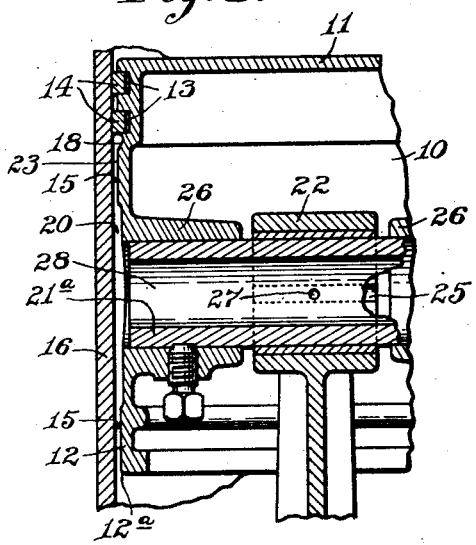
INVENTOR
Charles C. Hanch,
BY
G. Schley
ATTORNEY Patented Apr. 3, 1928.

1,664,507

UNITED STATES PATENT OFFICE.

CHARLES C. HANCH, OF CONNERSVILLE, INDIANA.

LUBRICATING PISTON.

Application filed February 9, 1922. Serial No. 535,115.

There has always been more or less trouble, and frequently great trouble, with pistons of internal combustion engines, resulting in "oil pumping," "piston slaps," and chafing or galling with the resultant scoring of the cylinder wall.

"Oil pumping" results from an excess quantity of oil passing the piston into the combustion chamber, which results in an excessive consumption of oil, fouling of spark plugs, and smoky exhaust from the muffler.

"Piston slaps" usually result from too great clearance between the piston and the cylinder wall, untrue or distorted pistons, and lack of efficient lubrication between the piston and the cylinder wall.

Scoring of cylinders, as a result of chafing or galling, is usually caused by distorted pistons or cylinder walls, expansion of pistons which were fitted without sufficient clearance in the cylinders, or lack of efficient lubrication between the piston and the cylinder wall.

It has been necessary heretofore to make pistons with extreme nicety, with exactly the proper clearance as nearly as that could be determined as a compromise between the too great clearance which produced slapping and usually produced oil pumping and the too little clearance which resulted in the scoring of the cylinder wall by the chafing of the piston against the cylinder. This compromise was never a cure, as it merely lessened one evil at the expense of increasing another.

In fact, prior to my invention so-called "excessive" clearance of the piston was considered an evil to be avoided. I have now discovered how to take advantage of large clearance and produce a piston which will not pump oil and will not slap.

It is the object of this invention to provide a piston for internal combustion engines so designed that it will float in oil in its operation, with relatively large clearance, and without slapping or oil pumping. More specifically, the object of the invention is to provide such a piston which will operate successfully without slapping with more clearance than is usually permissible; which will give maximum lubrication between the piston and the cylinder wall without permitting an excessive quantity of oil to pass the piston into the combustion chamber; which will provide proper relief for excessive oil pressure created by the scraping or packing action of the piston rings on the downward stroke of the piston; and which at the same time will provide an oil supply for lubricating the cylinder wall on the upward stroke and for lubricating the wrist pin.

The clearance between the piston and the cylinder wall, either normal or "excessive", is only a few thousandths of an inch. The distance from the bottom ring at the head of the piston to the bottom of the skirt, however, is usually a matter of three or more inches. Thus the annular clearance space is thousands of times longer than it is wide. Assuming that this space has within it a quantity of lubricating oil, and that the piston is about to commence its downward stroke, the piston ring or rings at the top of the piston are required to shave this film of oil off the wall of the cylinder, or at least all of it except a very much thinner film which, remaining, lessens wear of the cylinder wall and the rings engaging it. Since this remaining film appears on the wall of the combustion chamber as the piston descends, it should be kept at a minimum; otherwise it will tend to carbonization and its evils.

In the ordinary close-fitting piston the oil thus shaved off accumulates in the clearance space beneath the rings and has but one source of escape; it must flow down the clearance space moving along the surface of the cylinder wall because of the motion of the piston. As a matter of hydraulics it can readily be seen that the oil pressure below the bottom-most piston ring therefore rises to a very high point, due in part to the pressure required to move the oil down through the long and narrow clearance space, and in part to the inertia of the oil because at the start of the downward stroke the oil is at rest. This high pressure tends to lift the piston ring, (that is, to cause it to move back radially,) and such lifting allows an excessive quantity of oil to flow past the piston ring into the combustion chamber.

I am aware that attempts have been made to cure this evil by forming a relief groove below the piston ring with ports from this relief groove to the interior of the piston. In so far as relieving the high pressure of the oil and tending to prevent excessive quantity of oil from getting by the rings into the combustion chamber, such an arrangement works, with some degree of success; but it still requires a close clearance (to prevent piston slap) with its attendant evils, because this arrangement scrapes off and wastes a certain amount of oil adhering to the cylinder walls.

In carrying out my invention, I provide one or more piston rings at the head end of the piston, and only there, and allow the oil to pass freely upward along the side of the piston in the clearance space between it and the cylinder wall until it encounters a piston ring at or near the piston head, so that there is a freely supplied film of oil between the piston and the cylinder throughout the greater part of its length; this clearance space may be, and preferably is, relatively wide. At the lower side of the piston ring in or near the piston head, or of the lowermost piston ring if there are more than one, that is to say, at that side of the piston ring which is remote from the piston head, I provide a circumferential relief groove or passageway, either in the wall of the piston or in the piston ring, or both, for carrying the oil circumferentially; and I provide a reservoir into which this circumferential groove leads, preferably by a restraining connection. This reservoir is preferably a depression in the outer surface of the piston opposite or around or in the neighborhood of the end of the wrist pin; and it in turn has one or more relief passages, which preferably lead to the bearing surfaces of the wrist pin; the position of this relief in reference to the piston rings is important.

By this arrangement I am able to float the large-clearance piston on an unbroken film of oil and yet prevent excessive lubrication of the combustion chamber and thus prevent carbonization and the like. In my arrangement, the piston on its downward stroke, due to its large clearance, has its skirt floating on the cylinder wall in a substantial film of oil. As the piston descends, all but the necessary minimum portion of this film is shaved off by the piston ring. The oil thus shaved off accumulates in the relief groove, but the pressure does not build up excessively, because the oil flows from the relief groove into the reservoir; while the restraining connecting opening between them prevents emptying of the relief groove, so that it hold oil for lubricating the return stroke of the piston. If this reservoir in its turn had no opening or relief, it would only be a matter of so many strokes until the reservoir was filled up and excessive pressure would develop, but as the reservoir in turn has relief, the oil cannot rise to objectionable pressures. It is desirable to have the opening for the relief from this reservoir at a point lower than the piston ring, assuming that the piston is operated in the usual position; otherwise the oil forced into the reservoir from the relief groove will escape immediately, because of its inertia and the speed of the descending piston, and will not accumulate in the reservoir. At the same time, the relief from the reservoir must either be at a point remote from its lower end, assuming the piston is in its usual position, or the relief at that point must be a restraining one; otherwise the oil in the reservoir will escape in a non-useful direction. With the reliefs for the reservoir properly designed, on the upward stroke of the piston the oil therein and in the relief groove will return to the clearance space, thus maintaining the oil film upon which the piston floats.

My invention comprises means for preserving the film of oil between the piston and the cylinder wall, means for removing a portion of this oil on the down stroke so that the film which will appear in the combustion chamber is not of undue thickness, and means for preserving at least a substantial portion of the removed oil upon or within the piston so that it is returned to the clearance space upon the return stroke.

The accompanying drawings illustrate my invention: Fig. 1 is an elevation of a piston embodying my invention, looking at the end of the wrist pin, with a fragment of the associated cylinder wall in section and with the piston rings partially in section; Fig. 2 is a plan of the piston shown in Fig. 1, with the upper and lower parts in section on the lines 2—2 and 2ª—2ª, respectively, of Fig. 1; Fig. 3 is a fragmental longitudinal section on the line 3—3 of Fig. 1; Fig. 4 is a fragmental longitudinal section on the line 4—4 of Fig. 1; Fig. 5 is an enlarged longitudinal fragmental section, on the line 5—5 of Fig. 2, to show the clearance space and relief groove more fully and the former greatly exaggerated; Fig. 6 is partly a section similar to Fig. 4, showing one modification of the circumferential groove, and partly an elevation similar to Fig. 1 but with a modified wrist-pin arrangement; Fig. 7 is a view similar to Fig. 5, showing another modification of the circumferential groove; and Fig. 8 is a section on the line 8—8 of Fig. 6.

The piston 10 is fundamentally a conventional piston, with a head 11 and a skirt 12, and it is provided at or near the head 11 with one or more piston-ring grooves 13 for receiving any suitable piston rings 14, which in Figs. 1, 3, 4, 5, and 6 are of rectangular cross-section. Two piston rings are shown, but it is frequently unnecessary to have more than one. There are no piston rings along the skirt 12, save at the top thereof where such skirt merges into the head 11, so that there is an unrestricted passageway 15 for oil between the skirt 12 and the adjacent cylinder wall 16. The showing of the passageway 15 is exaggerated. Preferably the lower corner 12ª of the piston skirt 12 is rounded off, as best indicated in Fig. 5, to prevent such corner from scraping the oil off of the cylinder wall, and to permit the oil splashed from the crank-case onto the cylinder wall to enter freely into the space 15 and to flow along such space as far as the lower surface of the lower piston ring 14. The space 15 is preferably made rather wider than is usual, both to facilitate this and to prevent chafing or galling. Thus there is nothing to break down or interfere with the film of oil in such space 15, up as far as the lowermost piston ring 14 at or close to the piston head.

At the lower edge of the lowermost piston ring 14, I provide a circumferential relief groove, channel, or passageway into which the space 15 feeds. This passageway most conveniently takes the form of the oblique-bottom circumferential groove or channel 17 in the piston skirt just below but communicating with the lowermost piston-ring groove 13, as is indicated in Figs. 1, 3, 4, 5, and 7; but it may take other forms, such as the curved-bottom groove or channel 18 (shown in Figs. 6 and 8) in the wall of the piston adjacent to the lower face of the lower piston-ring 13, or a rabbet groove or channel 19, conveniently square-cornered though not necessarily so, in the lower outer corner of the lower piston ring 14ª (as shown in Fig. 7), in this last case being combined if desired with the oblique-bottom groove 17 in the piston wall. The grooves 17, 18, and 19 extend circumferentially around the piston, and communicate with an oil reservoir 20, which is conveniently provided by a shallow depression in the outer face of the piston skirt around or in the vicinity of the end of the wrist pin 21 (Figs. 1 and 2) or 21ª (Figs. 6 and 8) by which the piston is connected to the usual connecting rod 22, and/or by the shallow space provided at the end of the wrist-pin, and/or by the hole through the wrist-pin itself if such wrist-pin be hollow. With this arrangement, the reservoirs 20, for there is preferably one around each end of the wrist pin, are at points on the circumference of the piston at substantially right angles to the plane of movement of the connecting rod and to the line of lateral thrust which is exerted on the piston by the oblique reaction from the connecting rod. The reservoir construction just described is a convenient one, and has a number of advantages, but my invention contemplates forming the reservoir in any suitable manner. Preferably there is left an un-cut-away boss or land 23 directly above the wrist-pin end to assist in alining the piston, with a cut-away passage 24 at each side of such boss or land 23 leading from the reservoir 20 to the circumferential groove 17, 18, or 19. The passages 24 are restraining ones, to limit the oil-flow from the relief groove 17, 18, or 19; to this end they are conveniently made merely as shallow flat places on the piston surface. The reservoir 20 preferably extends well below the wrist pin, as is indicated in Figs. 1 and 6. The reservoir 20 also has a restraining relief outlet, preferably at an intermediate point in its height. Such relief outlet is most conveniently provided by oil grooves 25 which extend along the bearing surfaces of the wrist pin 21 or 21ª. Such grooves may communicate directly with the reservoir-depression 20 if the wrist pin turns in the pin-bosses 26 of the piston, as in Figs. 1 and 2; while if the wrist-pin is fast in such pin-bosses 26 and the connecting-rod 22 turns on it, such oil grooves conveniently communicate with the reservoir-depression 20 by ports 27 from the central hole 28 which is frequently provided in wrist-pins for the sake of lightness, as in Figs. 6 and 8. In the latter case the hole 28 in the wrist-pin increases the capacity of the oil reservoir. This reservoir-relief by the oil grooves 25 serves the additional function of lubricating the wrist-pin by oil under forced-feed pressure.

In operation, oil is supplied to the inner cylinder wall 16 in the ordinary manner, usually by a splash system. This oil fills the space 15 below the lowermost piston ring 14 as the piston 10 reciprocates; and such space 15 extends for the greater part of the length of the piston because there is no piston ring save close to the head 11 of the piston. As the piston 10 moves downward, the oil on the cylinder wall enters the space 15, and is not scraped off by the piston because of the provision of the rounded lower corner. The piston ring or rings 14 prevent the passage of much oil from the space 15 past such rings into the combustion space, for as the piston descends the lowermost ring 14 scrapes off the greater part of the oil from the cylinder wall 16. As the oil is thus scraped off by the lower ring 14, however, it enters the circumferential passageway 17, 18, or 19, and flows around the piston to the restraining passages 24, and through them into the reservoir 20. By thus permitting the oil to flow into the reservoir 20, the building up of an excess oil pressure tending to force too much oil past the piston rings is prevented, so that there is substantially no oil pumping even though the space 15 is quite wide; but the restraining passages 24 build up sufficient oil pressure for proper lubrication, and for preventing slapping. The oil which during the downward movement of the piston is thus scraped off the cylinder wall 16 by the lower piston ring 14 and fed through the circumferential passage into the reservoir 20 may escape from such reservoir to some extent by the oil grooves 25, so that the wrist pin is lubricated by a pressure oil feed. The relief groove 17 is ordinarily entirely full, and the reservoir 20 is at least partly full, of oil at the end of the down stroke of the piston, because while there is some escape at the sides and bottom of the reservoir, and a relief through the oil grooves 25 or their equivalents, lubricating oil has a certain viscosity and all of these openings are through comparatively narrow spaces, so that the oil is in fact retained at the bottom of the stroke in the reservoir 20. On the up-stroke of the piston, due to the laws of the flow of liquids, this retained oil is fed back into the clearance space 15, by its own inertia and by being "smeared" onto the cylinder wall, thus lubricating the bearing surfaces of the piston and cylinder. Moreover, during the downward stroke the excess oil scraped off by the piston ring is held at the proper pressure, not too high, by the restraining passages 24, so that while some flows into the reservoir an adequate quantity is pushed out over the edge of the grooves 17 all around the piston, and thus the clearance space is kept full of oil under sufficient pressure to prevent slapping. The reservoir tends to fill up upon repeated strokes of the piston, but when full it cannot cause too high pressure in the groove 17, which would tend to cause too much oil to flow past the piston rings, because the reservoir 20 does have a relief or reliefs although restricted ones.

In this way the piston 10 is made to float in oil, by the maintenance of the oil film between the piston and the cylinder; and this oil film effectively prevents any scoring of the cylinders due to chafing or galling from insufficient lubrication. In addition, the construction permits the space 15 to be made wider, for it is kept full of oil; and this assists in the prevention of scoring of the cylinders, because the clearance can be made sufficiently great so that the piston will not touch the cylinder as they expand unequally from the heat of the combustion. At the same time, the maintenance of this oil film at all times prevents slapping of the pistons, even though there is a clearance space 15 of considerable thickness, for the maintenance of the oil film completely filling this space effectively cushions the piston against the slapping movement.

I claim as my invention:

1. A piston for internal combustion engines, comprising a head and a skirt with a piston ring near the head end of the piston, said piston being provided with a substantially inperforate external circumferential passage at that side of said piston ring which is remote from the piston head, and being also provided in its outer face with a reservoir into which said circumferential passage feeds.

2. A piston for internal combustion engines, comprising a head and a skirt with a piston ring near the head end of the piston, said piston being provided with an external circumferential passage at that side of said piston ring which is remote from the piston head, and being also provided in its outer face with a reservoir into which said circumferential passage feeds, the connection between said circumferential passage and said reservoir being a restraining one.

3. A piston for internal combustion engines, comprising a head and a skirt with a piston ring near the head end of the piston, said piston being provided with an external circumferential passage at that side of said piston ring which is remote from the piston head, and being also provided with a reservoir into which said circumferential passage feeds, said reservoir being provided in the external surface of the piston by a depression therein on a part of the periphery of the piston removed from the plane of movement of the associated connecting rod, the connection between said circumferential passage and said reservoir being restricted.

4. A piston for internal combustion engines, comprising a head and a skirt with a piston ring near the head end of the piston, said piston being provided with an external circumferential passage at that side of said piston ring which is remote from the piston head, and being also provided below said piston ring with a reservoir into which said circumferential passage feeds substantially unrelievedly, said reservoir being provided with an outlet of relatively less capacity than said circumferential passage for relieving pressure.

5. A piston for internal combustion engines, comprising a head and a skirt with a piston ring near the head end of the piston, said piston being provided with an external circumferential passage at that side of said piston ring which is remote from the piston head, and being also provided below said piston ring with a reservoir into which said circumferential passage feeds substantially unrelievedly, said reservoir being provided with a restraining outlet at an intermediate point in its height for relieving pressure.

6. A piston for internal combustion engines, comprising a head and a skirt with a piston ring near the head end of the piston, said piston being provided with an external circumferential passage at that side of said piston ring which is remote from the piston head, and being also provided below said piston ring with a reservoir into which said circumferential passage feeds, the connection between said circumferential passage and said reservoir being a restraining one, and said reservoir being provided with a restraining outlet for relieving pressure.

7. A piston for internal combustion engines, comprising a head and a skirt with a piston ring near the head end of the piston, said piston being provided with an external circumferential passage at that side of said piston ring which is remote from the piston head, and being also provided with a reservoir into which said circumferential passage feeds, said reservoir being provided in the external surface of the piston by a depression therein, the connection between said circumferential passage and said reservoir being restricted.

8. A piston for internal combustion engines, comprising a head and a skirt with a piston ring near the head end of the piston, said piston being provided with a relief passage just below said piston ring and with a reservoir into which said relief passage discharges and which in turn feeds the clearance space around the piston on the upstroke, the connection between said relief passage and said reservoir being restricted.

9. In combination with a cylinder, a piston within and having a clearance space from said cylinder; said piston being provided with means for removing excess oil from such clearance space, for retaining this removed oil and returning it to the clearance space, and means for maintaining oil pressure in said clearance space during the down-stroke of the piston while preventing such pressure from rising so high that material oil leakage into the combustion chamber occurs.

10. A piston for internal combustion engines, comprising a head and a skirt and a piston ring near the head end of the piston, said piston being provided in its outer face with a reservoir, and with a passage separate from the reservoir for feeding oil from a face of the piston ring into said reservoir, said reservoir being provided with a restraining outlet for relieving excessive pressure.

11. A piston for internal combustion engines, comprising a head and a skirt and a piston ring near the head end of the piston, said piston being provided with a channel just below said piston ring, and with a separate superficial depression forming a reservoir into which said channel discharges, and which in turn feeds the clearance space around the piston on the upstroke, and with a restraining outlet greater than a mere capillary outlet for relieving excessive pressure.

12. A piston for internal combustion engines, comprising a head and a skirt and a piston ring near the head end of the piston, said piston being provided with an external circumferential passage at that side of said piston ring which is remote from the piston head, and being also provided below said piston ring with a reservoir into which said circumferential passage feeds surplus lubricant, and a restraining outlet for relieving excessive pressure.

13. In combination, a piston having a plurality of piston-ring grooves near one end, and a plurality of piston rings in said grooves, including a plain ring nearest the piston-end, a piston-ring groove for another piston ring having communication on its face remote from the piston-end with a circumferential oil channel into which the respectively associated piston ring scrapes oil, said oil channel having a restraining relief outlet for relieving excessive pressure, and said restraining relief outlet being out of direct communication with said oil channel.

In witness whereof, I have hereunto set my hand at Connersville, Indiana, this 4th day of February, A. D. one thousand nine hundred and twenty two.

CHARLES C. HANCH.